(12) United States Patent
Nagai

(10) Patent No.: US 7,536,996 B2
(45) Date of Patent: May 26, 2009

(54) FUEL INJECTION CONTROLLER AND FUEL INJECTION CONTROL SYSTEM

(75) Inventor: Koichi Nagai, Toyoake (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 12/010,960

(22) Filed: Jan. 31, 2008

(65) Prior Publication Data
US 2008/0201060 A1 Aug. 21, 2008

(30) Foreign Application Priority Data
Feb. 15, 2007 (JP) ............... 2007-034870

(51) Int. Cl.
*F02M 51/00* (2006.01)
*F02M 51/06* (2006.01)

(52) U.S. Cl. ...................... 123/435; 123/478

(58) Field of Classification Search ................. 123/435, 123/299, 305, 430, 496, 478, 472, 480, 488, 123/490, 499, 502
See application file for complete search history.

(56) References Cited

U.S. PATENT DOCUMENTS 6,659,068 B2 * 12/2003 Urushihara et al. ......... 123/295
6,722,345 B2 4/2004 Saeki et al.
7,021,278 B2 * 4/2006 Ishizuka et al. ............. 123/299
2005/0229903 A1 * 10/2005 Kobayashi et al. .......... 123/435

FOREIGN PATENT DOCUMENTS

JP A-2004-108286 4/2004

OTHER PUBLICATIONS

Notice of Reasons for Rejection issued Dec. 16, 2008 in corresponding Japanese Application No. 2007-034870 with an at least partial English-language translation thereof.

* cited by examiner

*Primary Examiner*—Mahmoud Gimie
(74) *Attorney, Agent, or Firm*—Nixon & Vanderhye P.C.

(57) ABSTRACT

A fuel injection controller (engine control ECU) controls a fuel injection mode of an engine having cylinder pressure sensors in all of four cylinders for measuring pressures in the cylinders. The controller measures a pressure (cylinder pressure) in the cylinder as an object cylinder (each of the four cylinders) based on an output of the corresponding cylinder pressure sensor when the fuel combustion is in progress in the object cylinder and the fuel to be used in the combustion is additionally injected and supplied to the same cylinder (e.g., when an after-injection is performed). The controller variably controls a command signal (i.e., pulse width) sent to the injector in relation to the target injection (the after-injection) on the basis of the measured cylinder pressure.

18 Claims, 3 Drawing Sheets

FUEL INJECTION CONTROLLER AND FUEL INJECTION CONTROL SYSTEM

CROSS REFERENCE TO RELATED APPLICATION

This application is based on and incorporates herein by reference Japanese Patent Application No. 2007-34870 filed on Feb. 15, 2007.

BACKGROUND OF THE INVENTION

1. Field of the Invention

The present invention relates to a fuel injection controller for controlling fuel injection supply to an engine and a control system used for fuel injection control.

2. Description of Related Art

As is well known, an engine (in particular, internal combustion engine) used as a motive power source of an automobile generates output torque by igniting and combusting fuel, which is supplied through injection performed with injectors, in cylinders. In recent years, automobile diesel engine or the like has come to employ an injection method (a multiple injection method) for performing a sub-injection of an injection quantity smaller than a main injection, which generates output torque, before or after the main injection in one combustion cycle.

Nowadays, fuel combustion noise and increase of NOx emission are regarded as serious problems. As one countermeasure against those problems is to perform a pilot injection or a pre-injection of a small injection quantity before the main injection. In some cases, for example, an after-injection is performed (at injection timing near the main injection) to activate diffusion combustion and eventually to reduce particulate matter emission or a post-injection is performed (at injection timing much later than the main injection) to activate a catalyst through increase of exhaust gas temperature or through supply of a reducing component after the main injection. In recent engine control, the fuel supply to the engine is performed in an injection mode (an injection pattern) that is the most suitable for each of various situations through one or an arbitrary combination of the various injections.

In such the fuel injection control of the multiple injection method, the fuel injection quantity of the sub-injection is much smaller than that of the main injection. Therefore, the pressure in the cylinder (cylinder pressure) as of the fuel injection has a great influence on the injection characteristic. In the case where the fuel injection control of the multiple injection method is employed, it is important to perform the injection control according to the cylinder pressure as of each fuel injection. To this end, for example, as described in Patent document 1 (JP-A-2003-227393), a proposed fuel injection controller variably controls a fuel injection quantity and a fuel injection period according to the cylinder pressure as of the fuel injection. The controller estimates current cylinder pressure by using an adaptation map (i.e., a map beforehand prepared through an experiment or the like) that associates the cylinder pressure at a start of the fuel injection with fuel injection timing (i.e., an injection start angle at the start of the fuel injection). The controller variably controls the fuel injection quantity and the fuel injection period of each fuel injection of the multiple injection on the basis of the estimated cylinder pressure.

The controller can control the fuel injection quantity and the fuel injection period to desired values with higher accuracy because the controller performs the control according to the cylinder pressure as of the fuel injection. However, since the controller senses the cylinder pressure through the estimation using the adaptation map, there is a case where the estimation is difficult depending on the current engine situation and the like. Accordingly, accurate cylinder pressure cannot be necessarily obtained for all of the fuel injections of the multiple injection method.

SUMMARY OF THE INVENTION

It is an object of the present invention to provide a fuel injection controller and a fuel injection control system capable of controlling an injection mode of an injector with high accuracy in more situations of an engine.

According to an aspect of the invention, a fuel injection controller controls a fuel injection mode of an injector by outputting a command signal when fuel used in combustion for generating an output power of a target engine is injected and supplied through the injector directly into a cylinder, in which the fuel combustion of the engine occurs. At least one cylinder pressure sensor is provided to at least one cylinder for outputting a sensing signal corresponding to pressure in the same cylinder. The controller has an injection control means for variably controlling the command signal sent to the injector in relation to certain injection supply of the fuel, which is performed during the fuel combustion in the cylinder having the cylinder pressure sensor as an object cylinder for additionally injecting and supplying the fuel to be used in the combustion in the cylinder as the object cylinder, on the basis of an output of the cylinder pressure sensor when the certain injection supply of the fuel is performed.

As mentioned above, also the controller described in Patent document 1 can accurately sense the pressure in the cylinder (i.e., the cylinder pressure) as of the injection such as the pilot injection or the main injection performed before the combustion or as of the injection such as the post-injection, which is performed at so late timing that the injection does not contribute to the combustion, with the use of the adaptation map (i.e., through the estimation based on the injection timing and the like). However, there exist many factors that affect the condition in the cylinder (and eventually the pressure in the cylinder) during the injection including the after-injection performed during the fuel combustion (i.e., in a period from ignition to extinction), and some of the factors cannot be predicted. Therefore, it is difficult even for the controller described in Patent document 1 to accurately sense the cylinder pressure as of the injection performed during the fuel combustion.

The inventor invented the above controller by paying attention to this point. That is, since the controller has the injection control means, the controller can actually measure the cylinder pressure on the basis of the output of the cylinder pressure sensor instead of estimating the cylinder pressure when the injection supply of the fuel is performed to the cylinder during the fuel combustion. Therefore, even when the fuel combustion is in progress and the fuel to be used in the fuel combustion is additionally injected and supplied, the injection mode of the injector can be controlled with high accuracy on the basis of the actual measurement value of the cylinder pressure (i.e., the sensor output). In this manner, with the above configuration, the injection mode of the injector can be controlled with high accuracy in more situations of an engine including the injection performed during the fuel combustion.

In the case where the cylinder pressure sensor is not attached to all of the cylinders but is attached to only part of the cylinders, a configuration of using the actual measurement value of the cylinder pressure of the cylinder(s) equipped with the cylinder pressure sensor to estimate the cylinder pressures of the other cylinders is effective. Thus, measurement or estimation of the cylinder pressures in many cylinders is enabled and accurate control of the injection mode (injection quantity or the like) can be performed on the basis of the measurement value while minimizing the number of sensors and the computation load.

In order to reduce the increase of the computation load due to the measurement of the cylinder pressure and the like, it is preferable to perform the control of the injector on the basis of the measurement of the cylinder pressure selectively for the injection additionally performed during the fuel combustion (e.g., the after-injection). That is, it is preferable to perform the control of the injector through the estimation for the injections (e.g., the pilot injection and the main injection) capable of achieving relatively high estimation accuracy and to perform the control of the injector through the measurement of the cylinder pressure using the sensor output for only the injection (e.g., the after-injection) incapable of achieving the high estimation accuracy.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Now, a fuel injection controller and a fuel injection control system according to an embodiment of the present invention will be described with reference to the drawings. The fuel injection control system according to the embodiment is a common rail fuel injection control system (high-pressure fuel supply system) for controlling, e.g., a reciprocating diesel engine (internal combustion engine) as an automobile engine that rotates an output shaft by converting an energy produced by fuel combustion into rotary motion. The fuel injection controller according to the embodiment is a diesel engine fuel injection controller that is provided in the system and used on an occasion of performing injection supply (direct injection supply) of the high-pressure fuel (e.g., light oil at injection pressure of 1000 atm or over) directly into a combustion chamber of each cylinder of the diesel engine.

Figure 1:
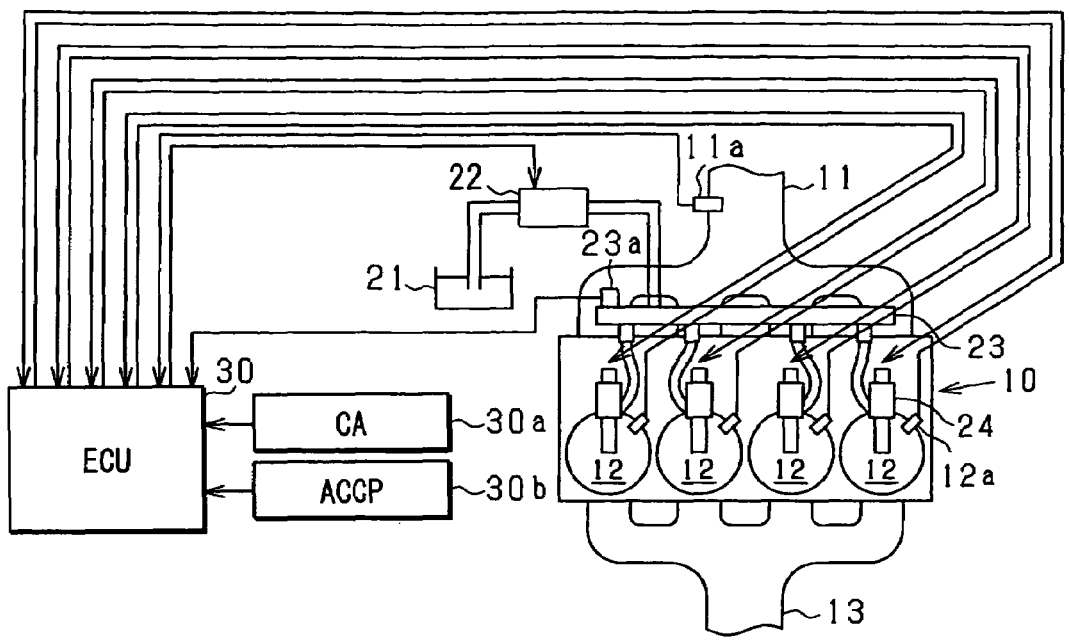
FIG. 1 is a configuration diagram showing a fuel injection controller and a fuel injection control system having the controller according to an embodiment of the present invention.

First, an outline of the common rail fuel injection control system (vehicular engine system) according to the embodiment will be described with reference to FIG. 1. FIG. 1 shows an outline of a configuration of the common rail fuel injection control system according to the embodiment, centering on a fuel supply system of an engine 10 as a control object. Although not shown in FIG. 1 for convenience of description, actuators and sensors such as a throttle valve, a supercharger, a fresh air flow rate measuring sensor (an air flow meter), and an intake air temperature sensor are provided on an upstream side of an intake air flow direction (i.e., on an air intake side) as appropriate according to the use (specifications) of the system and the like. Actuators and sensors such as an EGR device, an exhaust gas treatment device (such as a catalyst and a DPF), a muffler, an oxygen concentration sensor (such as an $O_2$ sensor or an A/F sensor), and an exhaust gas temperature sensor are provided on a downstream side of an exhaust gas flow direction (i.e., on an exhaust gas discharge side) as appropriate according to the use (specifications) of the system and the like. It is assumed that the engine 10 as a control object is a multi-cylinder engine (e.g., an in-line four-cylinder engine) for a four-wheel car.

As shown in FIG. 1, in general, the system is structured such that an ECU 30 (electronic control unit) takes in sensor outputs (sensing signals) of various sensors and controls drive of various devices constituting the fuel supply system on the basis of the sensor outputs. The ECU 30 regulates a fuel discharge quantity of a fuel pump 22 to a desired value by adjusting current supplied to a suction control valve (not shown). Thus, the ECU 30 performs feedback control (e.g., PID control) for conforming fuel pressure in a common rail 23 (i.e., current fuel pressure measured by a fuel pressure sensor 23a) to a target value (target fuel pressure). The ECU 30 controls the fuel injection quantity of a certain cylinder (one of the cylinders 12) of the engine 10 and eventually an output power of the engine 10 (i.e., rotation speed or torque of an output shaft) to desired values on the basis of the fuel pressure.

As devices constituting the fuel supply system, a fuel tank 21, the fuel pump 22, the common rail 23, and injectors 24 are disposed in this order from an upstream side of the fuel flow.

The fuel pump 22 has a high-pressure pump (e.g., a plunger pump) and a low-pressure pump (e.g., a trochoid feed pump). The fuel pump 22 is structured to suction the fuel from the fuel tank 21 with the low-pressure pump and to pressurize and discharge the suctioned fuel with the high-pressure pump. A pumping quantity of the fuel sent to the high-pressure pump and an eventual fuel discharge quantity of the fuel pump 22 are metered by a suction control valve (SCV: not shown) located on a fuel suction side of the fuel pump 22. That is, the fuel pump 22 is structured such that the fuel discharge quantity of the fuel pump 22 can be controlled to a desired value by regulating drive current (and an eventual valve opening degree) of the suction control valve. Thus, the fuel suctioned from the fuel tank 21 by the fuel pump 22 is pressurized and discharged (i.e., pumped) to the common rail 23. In the present embodiment, a normally-open flow control valve, which is fully opened in a de-energization state, is used as the suction control valve (SCV) in consideration of an engine operation in the case of a power system failure.

The common rail 23 stores the fuel pumped from the fuel pump 22 in a high-pressure state and supplies the fuel to the injectors 24 (fuel injection valves) of the respective cylinders 12 via pipes (high-pressure fuel passages) provided to the respective cylinders 12. The common rail 23 has the fuel pressure sensor 23a for sensing fuel pressure (rail pressure) in the common rail 23, enabling sensing and management of the rail pressure, which is correlated with the fuel injection pressure of the injector 24.

Figure 2:
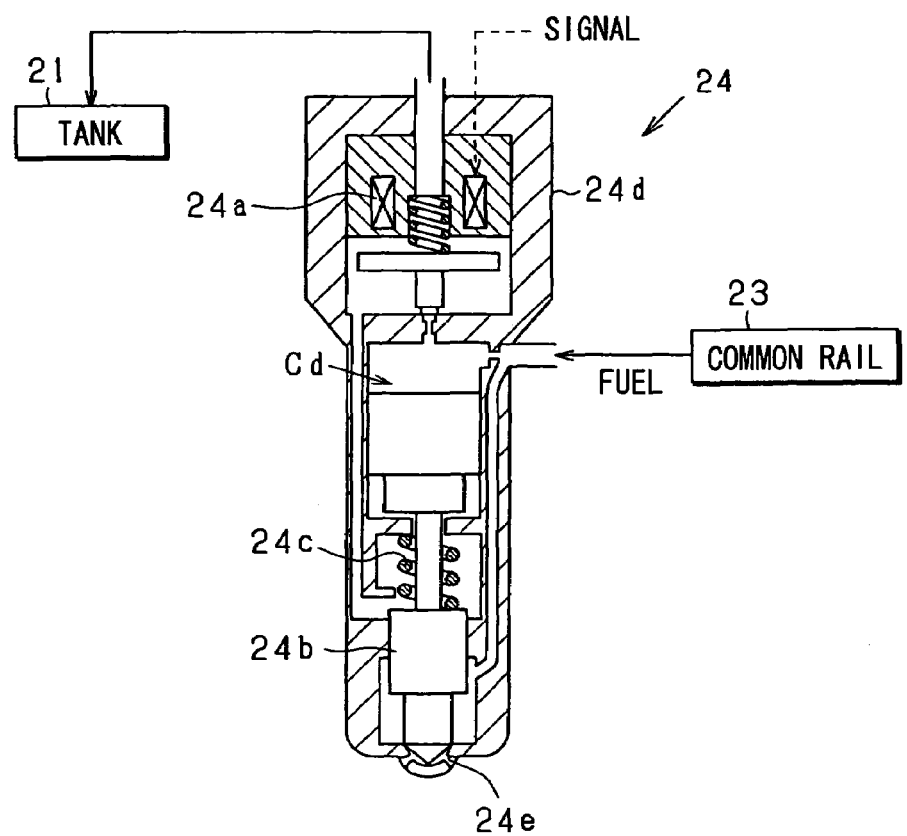
FIG. 2 is a side sectional diagram showing an internal structure of an injector according to the embodiment.

The injectors 24 are provided to combustion chambers in the cylinders 12 respectively. Cylinder pressure sensors 12a are provided to the combustion chambers respectively. Each cylinder pressure sensor 21a measures the pressure in the corresponding cylinder (i.e., cylinder pressure) with a sensing section located inside the combustion chamber (i.e., a tip portion of a probe inserted in the combustion chamber) and outputs a sensing signal (electrical signal) corresponding to the measurement value. The injector 24 is a fuel injection valve for high-pressure fuel for injecting the high-pressure fuel accumulated and held in the common rail 23. In particular, the injector 24 according to the present embodiment is a hydraulically-driven fuel injection valve, in which transmission of drive power on an occasion of the fuel injection is performed via a hydraulic chamber (command chamber). FIG. 2 shows a detailed structure of the injector 24.

As shown in FIG. 2, the injector 24 is a fuel injection valve of an inward valve-opening type. In the injector 24, a degree of fluid-tightness of the hydraulic chamber Cd and the eventual pressure in the hydraulic chamber Cd (corresponding to back pressure of a needle 24b) are increased or decreased according to the energization state (energization/de-energization) of a solenoid 24a constituting a two-way electromagnetic valve. Thus, the needle 24b reciprocates (vertically) in a valve cylinder (housing 24d) with or against an extensional force of a spring 24c (coil spring). As a result, a fuel supply passage leading to injection holes 24e (the necessary number of which is formed) is opened or closed at a halfway position thereof (i.e., at a prescribed seat surface on which the needle 24b is seated due to the reciprocation). The drive control of the needle 24b is performed by PWM (pulse width modulation) control. That is, the ECU 30 sends a pulse signal (energization signal) to the drive section (above-mentioned two-way electromagnetic valve) for the needle 24b. More specifically, a lift amount (i.e., a degree of separation from the seat surface) of the needle 24b is variably controlled on the basis of the pulse width (corresponding to the energization period). The lift amount increases as the energization period lengthens. An injection rate (the quantity of fuel injected per unit time) increases as the lift amount increases. The pressure increase processing of the hydraulic chamber Cd is performed through the fuel supply from the common rail 23. The pressure decrease processing of the hydraulic chamber Cd is performed by returning the fuel from the hydraulic chamber Cd to the fuel tank 21 via a pipe (not shown) connecting the injector 24 and the fuel tank 21. The injector 24 is a fuel injection valve that is closed in a de-energized state, i.e., is a normally-closed fuel injection valve.

As described above, the injector 24 has the needle 24b for opening/closing the injector 24 by opening/closing the fuel supply passage leading to the injection holes 24e through the prescribed reciprocating operation inside the valve body (housing 24d). In a deactivated state, the needle 24b is displaced to a valve-closing side by the force (i.e., the extensional force of the spring 24c) that is constantly applied to the needle 24b in a direction toward the valve-closing side. In an activated state, a drive force is applied to the needle 24b to displace the needle 24b to a valve-opening side against the extensional force of the spring 24c. The lift amount of the needle 24b changes approximately symmetrically between the deactivated state and the activated state.

The individual devices of the fuel supply system of the common rail fuel injection system according to the embodiment have been described above. Next, a configuration of the system will be described further by referring to FIG. 1.

The system is structured such that the fuel accumulated and held in the common rail 23 by the drive of the fuel pump 22 is injected and supplied directly into the cylinders 12 via the injectors 24 provided to the respective cylinders 12. During the operation of the engine 10, the intake air is introduced from an intake pipe 11 into the combustion chamber of each cylinder 12 through an opening operation of a suction valve (not shown) and is mixed with the fuel injected from the injector 24. The air-fuel mixture is compressed by a piston (not shown) in the cylinder 12, ignited (through self-ignition), combusted, and discharged to an exhaust pipe 13 as exhaust gas through an opening operation of an exhaust valve (not shown). The engine 10 is a four-stroke engine. In the engine 10, a current target cylinder 12 is determined sequentially by a cylinder determination sensor (electromagnetic pickup) attached to a camshaft (not shown) of the suction valve and the exhaust valve and combustion cycles each consisting of four strokes of an intake stroke, a compression stroke, a combustion stroke, and an exhaust stroke are performed sequentially in a cycle of 720° CA for each of the four cylinders 12.

As shown in FIG. 1, a pressure sensor 11a for sensing the pressure in the intake pipe 11 of the engine 10 is attached to the intake pipe 11. A vehicle (not shown) has various sensors and actuators for vehicle control. For example, in order to sense a rotation angle position and rotation speed (engine rotation speed) of the crankshaft, a crank angle sensor 30a that outputs a crank angle signal at every prescribed crank angle (e.g., in a cycle of 30° CA) is attached to an outer peripheral surface of the crankshaft as an output shaft of the engine 10. In order to sense a manipulation amount (accelerator position ACCP) of an accelerator pedal (drive manipulation member) by a driver, an accelerator sensor 30b that outputs an electrical signal corresponding to a state (displacement) of the accelerator pedal is attached to the accelerator pedal.

The ECU 30 functions as the fuel injection controller according to the embodiment in the above-described system and mainly performs engine control as the electronic control unit. The ECU 30 (engine control ECU) has a known microcomputer (not shown) and performs various kinds of control relating to the engine 10 in the mode that is the most suitable for the current situation by grasping the operation state of the engine 10 and the request of the user on the basis of sensing signals of the above-mentioned various sensors and by operating the various actuators such as the injectors 24 correspondingly. The microcomputer of the ECU 30 is basically composed of various computation devices, storage devices, signal processing devices, communication devices, power source circuits and the like such as a CPU (central processing unit) that performs various kinds of computation, a RAM (random access memory) as a main memory for temporarily storing data in the process of the computation, computation results and the like, a ROM (read-only memory) as a program memory, an EEPROM (electrically rewritable nonvolatile memory) as a data storage memory, a backup RAM (RAM energized by a backup power source such as a vehicle battery), signal processing devices such as an A/D converter and a clock generation circuit, and input/output ports for inputting/outputting signals between an inside and an outside. In the present embodiment, a high-speed digital signal processor (DSP) is provided separately from the CPU to improve the processing speed of signal processing in the control (in particular, the signal processing concerning the output of the cylinder pressure sensors 12a). The ROM beforehand stores various programs, control maps and the like relating to the engine control including programs relating to the fuel injection control. The data storage memory (e.g., the EEPROM) beforehand stores various control data and the like including design data of the engine 10.

The configuration of the fuel injection control system according to the embodiment has been described above in detail. The vehicle (e.g., a four-wheel car or a truck) mounted with the diesel engine as the control object is controlled by the above-described control system. In this system, the ECU 30 calculates a fuel injection quantity (engine control amount) on the basis of the sequentially-inputted outputs (sensing signals) of the various sensors. The ECU 30 controls indicated torque (generated torque) that is generated through the fuel combustion in the cylinders 12 (combustion chambers) and eventual shaft torque (output torque) that is actually outputted to the output shaft (crankshaft). More specifically, the ECU 30 calculates the fuel injection quantity corresponding to the current engine operation state, the manipulation amount ACCP of the accelerator pedal by the driver and other factors and outputs an injection control signal for commanding the fuel injection of the calculated fuel injection quantity to the injector 24 in synchronization with desired injection timing. A drive amount of the injector 24 (e.g., a valve opening period) is decided on the basis of the command signal and the output torque of the engine 10 is controlled to a target value on the basis of the drive amount. As in the known system for the diesel engine, the control system according to the embodiment keeps a throttle valve, which is arranged in an air intake passage of the engine 10, in an approximately fully opened state during a steady operation to increase the fresh air quantity and to reduce a pumping loss. Therefore, during the steady operation, the combustion control (in particular, the combustion control relating to the torque adjustment) is mainly the fuel injection quantity control. Next, basic processing of the fuel injection control according to the embodiment will be described with reference to FIG. 3.

Figure 3:
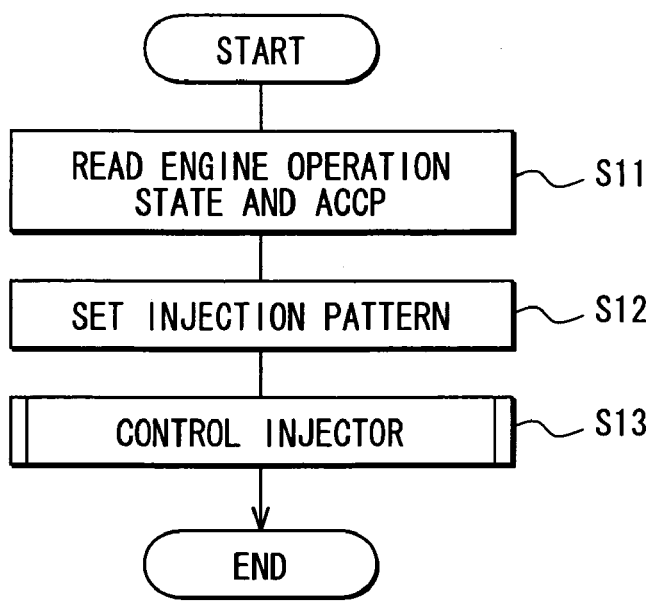
FIG. 3 is a flowchart showing a basic processing order of fuel injection control according to the embodiment.

Values of various parameters used in the processing of FIG. 3 are serially stored in the storage device mounted in the ECU 30 such as the RAM, the EEPROM or the backup RAM and updated any time when necessary. Basically, a series of the processing shown in FIG. 3 is executed once per combustion cycle for each cylinder 12 of the engine 10 (e.g., with a deviation of 180° CA between the cylinders 12) as the ECU 30 runs the program stored in the ROM. The fuel is supplied to all the cylinders 12 excluding a suspended cylinder in each combustion cycle through this program (i.e., multiple injection means).

In the processing shown in FIG. 3, first, at step S11, values of various parameters showing the engine operation states such as the engine rotation speed (which is sensed with the crank angle sensor 30*a*) and the rail pressure (which is sensed with the fuel pressure sensor 23*a*) and the manipulation amount ACCP of the accelerator pedal by the driver (which is sensed with the accelerator sensor 30*b*) are read. At next step S12, an injection pattern is set on the basis of the engine operation states, the accelerator manipulation amount ACCP and the like read at step S11 (if necessary, a required engine operation state is calculated separately).

The injection pattern is set on the basis of a prescribed map (or equation) stored in the ROM, for example. More specifically, for example, optimum patterns (adaptation values) for respective assumed engine operation states are determined through an experiment or the like and written to the map in advance. The map thus indicates a relationship between the engine operation states and the optimum patterns. For example, each injection pattern is defined by parameters such as the number of injection stages (injection number), the injection timing, the injection period (equivalent to the injection quantity), and an injection interval (i.e., interval between the injections in the case of the multiple injection). In the setting of the injection pattern at step S12, maps provided individually for the respective elements of the injection pattern (e.g., the number of the injection stages) or a map prepared to include some or all of the elements of the injection pattern may be used.

Even more specifically, at step S12, an optimum pattern (adaptation values) is set according to the map so that a required engine operation state corresponding to a current engine operation state (acquired at step S11) is satisfied. For example, the injection quantity (i.e., the injection period) is set variably according to required torque or the like in the case of the single injection, and a total injection quantity (i.e., a total injection period) is set variably according to the required torque or the like in the case of the multiple injection. The command value (i.e., the command signal) for the injector 24 is set on the basis of the thus-set injection pattern. In this manner, a pilot injection, a pre-injection, an after-injection, a post-injection, or the like is performed as appropriate together with a main injection according to the vehicle situation and the like.

At next step S13, the command value (i.e., the command signal) for the injector 24 is decided on the basis of the injection pattern set at step S12 including the number of the injection stages, the injection timing, the injection period, the injection interval and the like. At step S13, the driving of the injector 24 is controlled on the basis of the thus-determined command value.

In the present embodiment, the fuel is supplied to the engine 10 through the above-described fuel injection control. At step S13 in FIG. 3, when the fuel combustion is in progress in a certain cylinder (certain one of the cylinders 12) and the fuel to be used in the combustion is additionally supplied to the same cylinder 12 (in more detail, when the after-injection is performed), the command signal to the corresponding injector 24 relating to the injection (i.e., the after-injection) (in particular, a command relating to the injection quantity) is controlled variably on the basis of an output of the cylinder pressure sensor 12*a* attached to the same cylinder 12. This configuration enables control of the injection mode of the injector with high accuracy on the basis of an actual measurement value of the cylinder pressure even for the injection (i.e., the after-injection) that is performed during the fuel combustion. Next, step S13 in FIG. 3 will be described in more detail with reference to FIGS. 4 to 6, centering on the signal processing using the output of the cylinder pressure sensor 12*a*.

Figure 4:
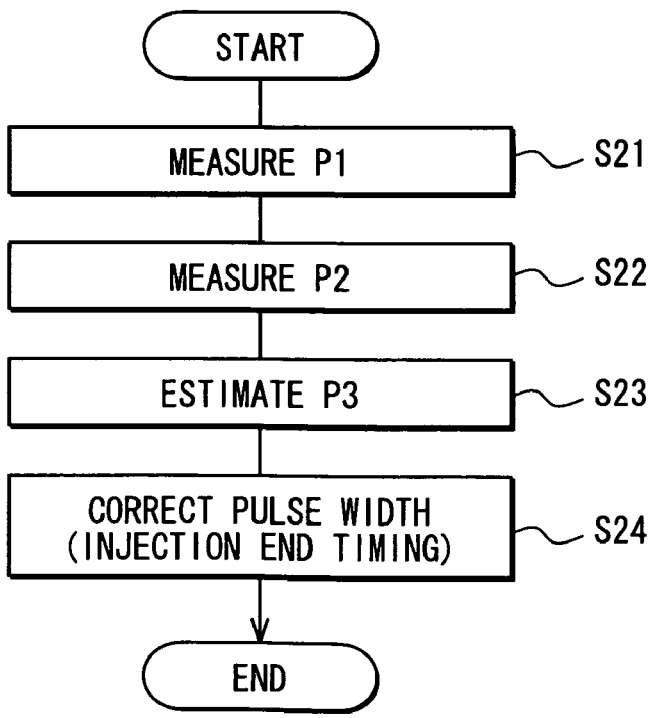
FIG. 4 is a flowchart showing contents and an order of processing for correcting a command signal sent to the injector in relation to an after-injection according to the embodiment.
Figure 5:
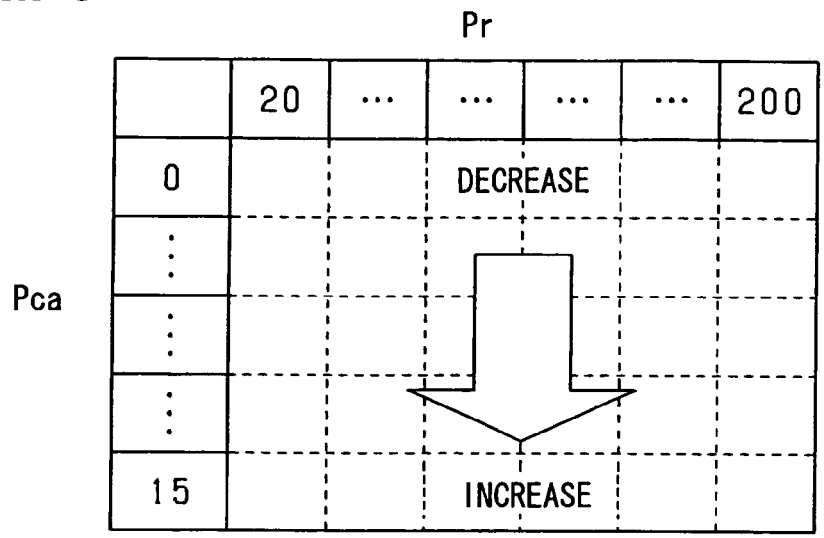
FIG. 5 shows a map for the correction processing according to the embodiment.

FIG. 4 is a flowchart showing contents and a processing order of a series of processing that is executed when the command signal (in particular, the command relating to the injection quantity) for the injector 24 concerning the after-injection is corrected on the basis of the signal processing using the output of the cylinder pressure sensor 12*a*. The processing of FIG. 4 is executed in synchronization with the injection command of the after-injection. FIG. 5 shows a map that is used in the processing of FIG. 4. The following description will be directed to an example of an injection pattern (three-stage injection) consisting of a pilot injection, a main injection, and an after-injection. That is, at step S13 in FIG. 3, the after-injection is performed after the pilot injection and the main injection are performed in this order.

When performing each of the pilot injection and the main injection, like the controller described in Patent document 1, the pressure (i.e., cylinder pressure) in the cylinder 12 as the object cylinder (one of the cylinders 12) corresponding to the injection timing (i.e., the injection timing command value based on the injection pattern set at step S12 in FIG. 3) is acquired by using a prescribed map or the like. More specifically, the cylinder pressure is acquired by using a prescribed map (or an equation stored in the ROM or the like), which is prepared for each of the pilot injection and the main injection through an experiment or the like and is written with an adaptation value (estimate) of the cylinder pressure for each injection start timing (which is expressed with a crank angle, for example). Then, the command signal (i.e., the pulse width) relating to the injection quantity of the injector 24 is corrected by substituting the cylinder pressure estimate and an actual measurement value of the pressure in the intake pipe 11 (which is sensed with the pressure sensor 11a, for example) into a prescribed equation (or a map stored in the ROM or the like). More specifically, the pulse width is increased as the cylinder pressure increases. Then, the thus-corrected command signal is further corrected on the basis of the rail pressure sensed with the fuel pressure sensor 23a immediately before or during each injection by using a prescribed map or the like. In other words, injection end command schedule timing (equivalent to scheduled pulse width) is corrected. More specifically, the pulse width is reduced as the rail pressure increases. Each injection is performed on the basis of the thus-corrected pulse width.

On an occasion of the following after-injection, the processing of FIG. 4 is executed. More specifically, this processing is triggered when the injection command (valve opening operation start command) is sent to the injector 24. As described above, the after-injection is performed during the combustion of the fuel (which is ignited by the main injection) in the cylinder 12 as the object cylinder to additionally inject and supply the fuel into the same cylinder 12 such that the injected and supplied fuel is used in the combustion.

As shown in FIG. 4, in a series of the processing, first at step S21, the pressure (cylinder pressure P1) in the cylinder 12 as the object cylinder (one of the cylinders 12) is actually measured on the basis of the output of the cylinder pressure sensor 12a at timing (injection start command timing) when a valve opening operation start command (corresponding to the rise of the injection command pulse) is sent to the injector 24. At next step S22, the pressure (cylinder pressure P2) in the cylinder 12 as the object cylinder is actually measured on the basis of the output of the cylinder pressure sensor 12a at timing (injection start timing) when the injector 24 starts the valve opening operation. At this time, the injection start timing is estimated based on a prescribed map or the like in accordance with the above-mentioned injection start command timing and an invalid injection period (i.e., a period from a time when the injector 24 is energized to a time when the fuel is actually injected). At next step S23, cylinder pressure P3 (valve closing timing cylinder pressure) at timing (injection end schedule timing) when the injector 24 ends the valve closing operation is predicted on the basis of the cylinder pressures P1, P2. More specifically, the cylinder pressure P3 is predicted through linear extrapolation of the cylinder pressures P1, P2.

At next step S24, average pressure between the injection start timing and the injection end schedule timing is calculated on the basis of the cylinder pressures P2, P3 at the timings. More specifically, the average pressure is calculated by an equation: the average pressure=(P2+P3)/2, for example. Then, a correction value for correcting the command signal (i.e., the pulse width) relating to the injection quantity of the injector 24 is determined on the basis of the calculated average value of the cylinder pressure and the rail pressure at that time (near the injection start timing). FIG. 5 shows an exemplary map used for acquiring the correction value.

As shown in FIG. 5, the map is a two-dimensional map that uniquely decides a correction value (a pulse width correction value) corresponding to the average cylinder pressure Pca and the rail pressure Pr when the average cylinder pressure Pca and the rail pressure Pr are decided (both acquired at step S24). The map prescribes a tendency as shown in FIG. 5 in the correspondence relationship between the correction value and the parameters such that the pulse width is increased (i.e., the injection quantity is increased) as the average cylinder pressure Pca increases. It is because the cylinder pressure (equivalent to external pressure of the injector 24) acts on the injection holes 24e from an outside of the injector 24 so as to suppress the fuel injection from the injector 24. As for the rail pressure Pr, as in the case of the pilot injection, the pulse width is shortened as the rail pressure Pr increases. In this map, the reference value 0 of the average cylinder pressure Pca can be set arbitrarily. In general, in experiments and the like, a value corresponding to the vicinity of a TDC (top dead center) is often used as a reference for adaptation. Therefore, also in this map, a cylinder pressure corresponding to the vicinity of the TDC should be preferably set as the reference value 0 of the average cylinder pressure Pca.

In the control of the after-injection according to the embodiment, the correction value is decided according to such the map and the command signal (i.e., the pulse width) relating to the injection quantity of the injector 24 is corrected with the thus-decided correction value. The after-injection is performed on the basis of the corrected command signal (i.e., the pulse width).

Figure 6:
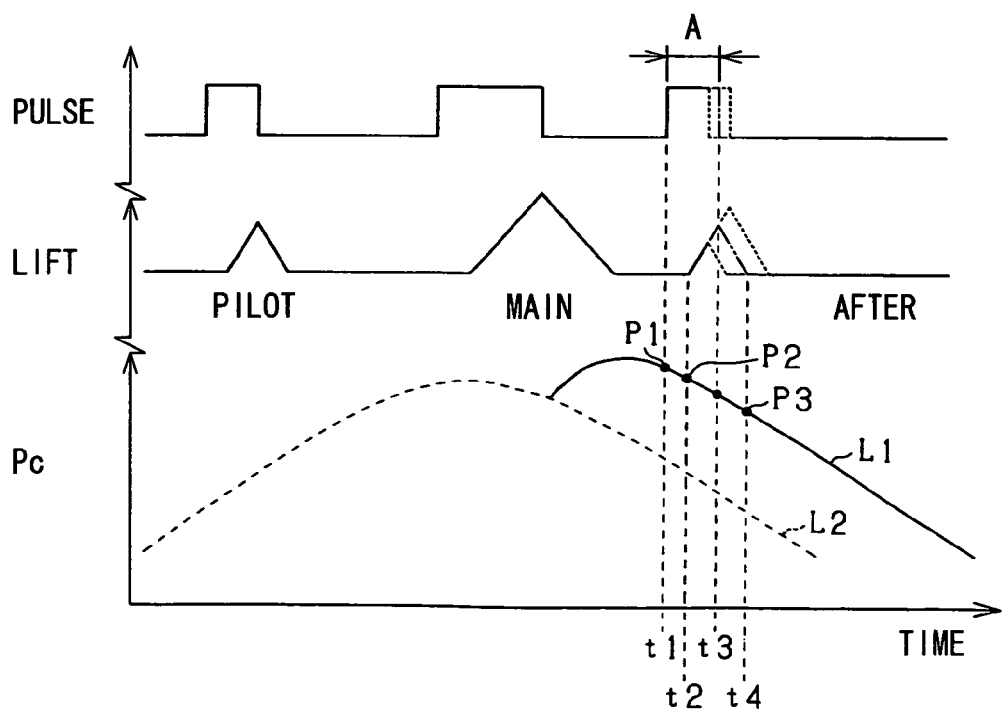
FIG. 6 is a timing chart showing transitions of parameters during the correction processing according to the embodiment.

Next, a series of the processing of FIG. 4 will be described further with reference to FIG. 6, centering on the execution timing of each processing and changes (transitions) of the respective parameters accompanying the execution of the processing. FIG. 6 is a timing chart showing the transitions of the parameters during the processing. When the pilot injection or the main injection is performed, the cylinder pressure Pc (outside a combustion period) indicated by a broken line L2 in FIG. 6 can be estimated with high accuracy through the above-described map estimation. In contrast, on an occasion of the subsequent after-injection, it is difficult to estimate the cylinder pressure Pc with high accuracy because the condition in the cylinder 12 is complicated. In view of this, on the occasion of the after-injection, as described above, the cylinder pressure Pc (during the combustion period) is actually measured on the basis of the output of the cylinder pressure sensor 12a. Accordingly, the cylinder pressure Pc (during the combustion period) as indicated by a solid line L1 in FIG. 6 is sensed at respective prescribed timings.

More specifically, the processing of FIG. 4 is started at the injection start command timing t1. First, as the processing at step S21, the cylinder pressure P1 is actually measured on the basis of the output of the cylinder pressure sensor 12a. Then, as the processing at step S22, the cylinder pressure P2 is actually measured on the basis of the output of the cylinder pressure sensor 12a at the injection start timing t2. After the processing of step S22 ends, as the processing at step S23, before the injection end schedule timing t4, the cylinder pressure P3 (valve closing timing cylinder pressure) at the timing t4 is predicted through the linear extrapolation of the cylinder pressures P1, P2. In the present embodiment, since the injection period from t2 to t4 (approximately 500-1000 μsec, for example) and the eventual period from t1 to t4 are sufficiently short, the cylinder pressure P3 is approximately determined by assuming that the cylinder pressures P1-P3 are on a straight line.

Subsequently, as the processing at step S24, before the injection end schedule timing t4, the average pressure between the injection start timing t2 and the injection end schedule timing t4 is calculated on the basis of the cylinder pressure P2 at the timing t2 and the predicted value of the cylinder pressure (cylinder pressure P3) at the timing t4. The thus-calculated average value of the cylinder pressure Pc corresponds to the cylinder pressure Pc at the center timing t3 between the timings t2, t4. As shown by a chain double-dashed line (PULSE) in FIG. 6, the center timing t3 corresponds to scheduled timing when a valve closing operation start command (corresponding to the fall of the injection command pulse) is supposed sent to the injector 24 (i.e., the injection end schedule timing temporarily set on the basis of the injection pattern set at step S12 in FIG. 3). Width "A" in FIG. 6 represents the scheduled pulse width. As shown by another chain double-dashed line (LIFT) in FIG. 6, the center timing t3 also corresponds to timing when the needle 24b (see FIG. 2) is placed at the maximum displacement position (i.e., the maximum lift position) on the valve-opening side.

At step S24, before the injection end schedule timing t4 and even before the center timing t3 (i.e., the valve closing operation start command timing), that is, near the injection start timing t2, the cylinder pressure Pc at the timing t3 (i.e., the average value Pca of the cylinder pressure Pc) is determined and the correction value corresponding to the cylinder pressure Pc (Pca) and the rail pressure Pr at that time is determined on the basis of the map of FIG. 5. Therefore, the pulse width (i.e., the schedule pulse width A that is based on the injection pattern set at step S12 in FIG. 3) can be shortened (i.e., the injection quantity can be reduced) or elongated (i.e., the injection quantity can be increased) according to the correction value. In other words, the injection end command schedule timing can be advanced or delayed as appropriate according to the correction value as indicated by dotted lines PULSE and LIFT in FIG. 6.

In the present embodiment, the processing of FIG. 4 is executed every time the injection (e.g., the after-injection) of the fuel to be used in the combustion is performed during the combustion. In the case where such the injection is performed multiple times during one combustion, the processing of FIG. 4 is executed every time each of the multiple injections is performed. As a result, the injection mode (in particular, injection quantity) of the injector 24 can be controlled with high accuracy even for the injection (e.g., the after-injection) performed during the combustion of the fuel.

As described above, the fuel injection controller and the fuel injection control system according to the embodiment provide the following superior effects.

(1) The fuel injection controller (i.e., the engine control ECU 30) controls the fuel injection mode of the engine 10, which has the cylinder pressure sensors 12a respectively attached to all the four cylinders 12 for measuring the pressures in the respective cylinders 12. The fuel injection controller has the program (cylinder pressure measuring means: steps of FIG. 4) for measuring the pressure (cylinder pressure) in the cylinder 12 as the object cylinder (each of the four cylinders 12) on the basis of the output of the corresponding cylinder pressure sensor 12a when the fuel combustion is in the progress in the cylinder 12 as the object cylinder and the injection supply of the fuel to be used in the combustion in the same cylinder 12 into the same cylinder 12 is additionally performed during the fuel combustion (e.g., when the after-injection is performed). The controller has the program (injection control means: steps of FIG. 4) for variably controlling the command signal (the pulse width) for the injector 24 relating to the target injection on the basis of the actually measured cylinder pressure (actual measurement value). Accordingly, the injection mode (in particular, the injection quantity) of the injector 24 can be controlled with high accuracy in more situations of the engine including the injection performed during the combustion of the fuel.

(2) The controller has the program (multiple injection means) for supplying the fuel in the injection method of injecting the total fuel quantity, which is supposed to be injected in one combustion cycle, in multiple times (i.e., in the multiple injection method). The processing of FIG. 4 is directed to the after-injection that is performed next to the main injection, which generates a main part of output power of the engine 10 among the multiple injections performed by the program (the multiple injection means), and variably controls the command signal (i.e., the pulse width) of the injector 24 relating to the after-injection. With such the configuration, the fuel injection quantity of the after-injection can be controlled with high accuracy and eventually effects of the after-injection such as activation of diffusion combustion and reduction of particulate matter emission can be improved.

(3) As for the pilot injection or the main injection, the injector 24 is controlled through the map estimation. The above-described control of the injector 24 on the basis of the actual measurement of the cylinder pressure (i.e., the sensor output) is selectively applied only to the after-injection. Thus, for example, the increase in computation load accompanying the measurement of the cylinder pressure (i.e., the sensor output) can be inhibited.

(4) In the processing of FIG. 4, the command signal (i.e., the pulse width) relating to the injection quantity of the injector 24 is variably controlled on the basis of the output of the cylinder pressure sensor 12a obtained at the timing (i.e., the injection start command timing t1) when the valve opening operation start command (corresponding to the rise of the pulse) is sent to the injector 24. In the processing of FIG. 4, the command signal (i.e., the pulse width) relating to the injection quantity of the injector 24 is variably controlled on the basis of the output of the cylinder pressure sensor 12a obtained at the timing (i.e., the injection start timing t2) when the injector 24 starts the valve opening operation. In the processing of FIG. 4, the pressure in the target cylinder 12 at the timing (i.e., the injection end schedule timing t4) when the injector 24 ends the valve closing operation (i.e., the valve closing timing cylinder pressure) is predicted on the basis of the output of the cylinder pressure sensor 12a at timing before the injection end schedule timing t4. The command signal (i.e., the pulse width) relating to the injection quantity of the injector 24 is variably controlled on the basis of the predicted valve closing timing cylinder pressure. The injection quantity of the injector 24 can be controlled with higher accuracy by combining the above schemes. Moreover, by using the cylinder pressures at the above-described timings, the data with high reproducibility, that is, data containing only a small deviation between the value during the experiment conducted in advance and the value during the actual use, is obtained. As a result, the fuel injection quantity control of the injector 24 can be performed with higher reliability.

(5) In the processing of FIG. 4, the valve closing timing cylinder pressure is predicted on the basis of the output of the cylinder pressure sensor 12a at the timing (i.e., the injection start command timing t1) when the valve opening operation start command (corresponding to the rise of the pulse) is sent to the injector 24 and the output of the cylinder pressure sensor 12a at the timing (i.e., the injection start timing t2) when the injector 24 starts the valve opening operation. With such the configuration, the valve closing timing cylinder pressure can be predicted with high accuracy.

(6) In the processing of FIG. 4, the valve closing timing cylinder pressure is predicted through the linear extrapolation from the sensor output at the timing (i.e., the injection start command timing t1) when the valve opening operation start command is sent to the injector 24 and the sensor output at the timing (i.e., the injection start timing t2) when the injector 24 starts the valve opening operation. With such the configuration, the prediction with high accuracy can be performed.

(7) In the processing of FIG. 4, the average pressure (corresponding to the center pressure at the center timing t3) between the timing (i.e., the injection start timing t2) when the injector 24 starts the valve opening operation and the timing (i.e., the injection end schedule timing t4) when the injector 24 ends the valve closing operation is determined on the basis of the output of the cylinder pressure sensor 12a at the timing t2 and the predicted value of the cylinder pressure (the valve closing timing cylinder pressure) at the timing t4. The command signal relating to the injection quantity of the injector 24 is variably controlled on the basis of the thus-determined average pressure. The average pressure or the center pressure serves as an important reference in determining the injection quantity. Also in this sense, with such the configuration, the accuracy concerning the injection quantity on the occasion of the after-injection is improved.

(8) The injector 24 having the structure shown in FIG. 2 is employed as the injector for supplying the fuel to the target engine 10. The injector 24 has the needle 24b that performs prescribed reciprocating action inside the valve body (i.e., the housing 24d) to open/close the fuel supply passage leading to the injection holes 24e and eventually to open/close the injector 24. In the deactivated state, the needle 24b is displaced to the valve-closing side by the force (i.e., the extensional force of the spring 24c) that is directed toward the valve-closing side and is constantly applied to the needle 24b. In the activated state, the drive force is applied to the needle 24b, so the needle 24b is displaced to the valve-opening side against the extensional force of the spring 24c. In the present embodiment, such the injector is employed and the cylinder pressure at the timing (i.e., at the center timing t3) when the needle 24b is located at the maximum displacement position (i.e., the maximum lift position) on the valve-opening side is determined on the basis of the outputs of the cylinder pressure sensor 12a at the timings t2, t4 before and after the timing t3. Further, the command signal (i.e., the pulse width) relating to the injection quantity of the injector 24 is variably controlled on the basis of the thus-determined cylinder pressure. Thus, the injection quantity can be controlled with high accuracy on the basis of the actually measured cylinder pressure at the timing t3 when the operation of the injector is stabilized (i.e., when the operation is substantially brought to a static state).

(9) In the processing of FIG. 4, the correction value is determined on the basis of the output of the cylinder pressure sensor 12a before the output of the valve closing operation start command to the injector 24, that is, at the timing (near the injection start timing t2) preceding the timing t3. Moreover, the command signal (i.e., the pulse width) relating to the injection quantity of injection of the injector 24 is corrected on the basis of the determined correction value. The cylinder pressure (and eventually the injection characteristic) near the timing t2 is serially monitored and the timing of the command signal for the injector 24 (in particular, the timing of the valve closing operation start command, i.e., the injection end command schedule timing) is corrected (or a scheduled value is corrected) as appropriate to timing corresponding to the current injection characteristic. Thus, the timing of the valve closing operation start command and the eventual injection quantity can be serially corrected on the basis of the current cylinder pressure (i.e., actual measurement value). Furthermore, the injection quantity can be constantly controlled to a desired value with high accuracy.

(10) The fuel injection control system has the engine 10 for generating torque with the use of combustion energy produced in the cylinders 12 and for rotating the output shaft with the generated torque, the injectors 24 for injecting and supplying the fuel to be used in the combustion directly into the respective cylinders 12, the cylinder pressure sensors 12a (provided for all the four respective cylinders 12) for measuring the pressures in the cylinders 12, and the program (cylinder pressure measuring means: steps of FIG. 4) for measuring the pressure in the target cylinder 12 (i.e., the cylinder pressure) when performing the additional injection supply of the fuel to be used in the combustion into the cylinder 12 from the corresponding injector 24 on the basis of the output of the corresponding cylinder pressure sensor 12a. The fuel injection control system can realize a system capable of controlling the injection mode of the injector 24 with high accuracy in more situations of the engine.

The above embodiment may be modified as follows, for example.

In the above embodiment, the average pressure between the injection start timing t2 and the injection end schedule timing t4 is determined on the basis of the output of the cylinder pressure sensor 12a (i.e., the cylinder pressure P2) at the timing t2 and the predicted value (i.e., the cylinder pressure P3) of the valve closing timing cylinder pressure at the timing t4. The present invention is not limited thereto. Alternatively, for example, the average pressure between the timings t2, t4 may be determined by using one or more pressure values between the timings t2, t4 in addition to the pressures at the timings t2, t4.

In the above embodiment, the correction value of the command signal sent to the injector 24 is determined on the basis of the cylinder pressures at the timings t1, t2, t4. The present invention is not limited thereto. Alternatively, for example, the correction value of the command signal may be determined on the basis of the cylinder pressure(s) at one or two of the timings t1, t2, t4. An effect that is the same as or similar to the effect (9) can be exerted by determining the correction value on the basis of the output(s) of the cylinder pressure sensor 12a at least before outputting the valve closing operation start command to the injector 24.

It is also effective to provide the controller with a program (cylinder pressure storing means) for storing cylinder pressures measured through the processing of FIG. 4 in a prescribed storage device in association with injection conditions such as the measurement timings of the cylinder pressures and the rail pressure. Such the configuration can reduce the number of times (frequency) of measurement of the cylinder pressure on an occasion of the target injection by using the cylinder pressure stored in the storage device without measuring the cylinder pressure each time. In this case, since the past value (e.g., a preceding value) can be used, there is no need to determine the correction value before the timing of sending the valve closing operation start command to the injector 24. The storage device for storing the cylinder pressures should be preferably a nonvolatile storage device such as the EEPROM or the backup RAM. In this configuration, the data (cylinder pressures obtained at the respective timings) are held in a nonvolatile manner, for example, even after the engine 10 is stopped (e.g., the ignition switch is turned off) and the power to the controller (i.e., the ECU 30) is shut off. Accordingly, when the engine 10 is started next time, the above-described correction and the like can be performed on the basis of the stored data as of the previous engine start.

The cylinder pressure measured with the pressure sensor (the cylinder pressure sensor 12a) provided to the cylinder 12, or more specifically, the pressure (which is stored in the EEPROM, for example) in the cylinder 12 at the time when the fuel combustion is in progress in the cylinder 12 and the injection supply of the fuel to be used in the combustion in the same cylinder 12 is additionally performed to the same cylinder 12, may be used for data analysis through data storage, failure diagnosis of the fuel supply system including the injectors 24 or the like in addition to the above-described correction of the injection mode.

In the above embodiment, the injection end command schedule timing that is temporarily set on the basis of the injection pattern set at step S12 of FIG. 3 is corrected (i.e., the scheduled value is changed) as appropriate to the value corresponding to the current cylinder pressure. The present invention is not limited thereto. Alternatively, a new value may be determined sequentially in accordance with the current cylinder pressure and may be set sequentially (or the scheduled value may be updated or a parameter in a reset state may be set without setting the scheduled value) as the injection end command timing, i.e., the timing of sending the valve closing operation start command (corresponding to the fall of the injection command pulse) to the injector 24.

In the above embodiment, the cylinder pressure at the timing when the needle 24*b* is located at the maximum displacement position (i.e., the maximum lift position) on the valve-opening side is estimated as the cylinder pressure at the center timing t3 on the basis of the preceding cylinder pressure and the subsequent cylinder pressure. The present invention is not limited thereto. Alternatively, the cylinder pressure at the needle maximum displacement position may be sensed by an arbitrary method. For example, a configuration of providing a sensor for measuring the lift amount of the needle 24*b* to the injector 24 may be employed. In this case, for example, the timing when the needle 24*b* is located at the maximum displacement position (i.e., the maximum lift position) on the valve-opening side is actually measured on the basis of the sensor output and the cylinder pressure at the timing is actually measured as the cylinder pressure at the needle maximum displacement position on the basis of the output of the cylinder pressure sensor 12*a*. Such the sensor (needle lift amount sensor) has not been put into practical use because of insufficient sensor life or the like at present though the sensor is used in tests and the like. Nevertheless, there is a possibility that such the sensor will be put into practical use (i.e., in an automobile or the like in the market) in the future.

In the above embodiment, in order to inhibit the increase of the computation load or the like accompanying the measurement of the cylinder pressure, the control of the injector 24 based on the actual measurement of the cylinder pressure is selectively applied to the after-injection (whereas the other injections are controlled through the estimation using the map). The present invention is not limited thereto. Alternatively, the control of the injector 24 may be performed on the basis of the actual measurement of the cylinder pressure on the occasion of the pilot injection and/or the main injection in addition to the after-injection.

Although the injector 24 having the structure shown in FIG. 2 is employed in the above embodiment, the structure of the injector of the target engine may be selected arbitrarily according to the use and the like. That is, the injector is not limited to the electromagnetic drive type injector that uses the electromagnetic solenoid as the actuator but may be a piezo injector that uses a piezoelectric element as an actuator for a needle, for example. Furthermore, the injector is not limited to the hydraulic drive type injector that is controlled by the pulse signal in the binary mode but may be a direct-drive injector (e.g., a direct-drive piezo injector currently in a development stage), in which the needle lift amount and the eventual injection rate can be varied continuously and directly according to the supply amount of the drive current. Still further, an injector that opens/closes injection holes with a needle or an outward valve-opening type injector may be employed.

In the above embodiment, the three injections (i.e., the pilot injection, the main injection, and the after-injection) are performed in one combustion cycle. The present invention can be also applied similarly to a case of performing only two injections of the main injection and the after-injection in one combustion cycle or a case of performing four or more injections of, e.g., the pilot injection, the pre-injection, the main injection, the after-injection and the post-injection in one combustion cycle, for example. The injection as the control object is not limited to the so-called after-injection but may be an arbitrary injection as long as the injection is performed during the combustion to supply the fuel to be used in the combustion.

The type of engine as the control object and the system configuration can be changed as appropriate according to the use and the like. The engine type is not limited to the compression ignition type diesel engine but may be a spark ignition type direct injection gasoline engine. For example, though the cylinder pressure sensor 12*a* is attached to every cylinder 12 in the above embodiment, the cylinder pressure sensor 12*a* may be attached to only part (e.g., one) of the cylinders 12. In this case, a configuration of estimating the cylinder pressures of the other cylinders 12 by using the actual measurement value of the cylinder pressure of the cylinder(s) equipped with the cylinder pressure sensor(s) 12*a* is effective. Thus, the cylinder pressures of many cylinders can be measured and the injection mode (injection quantity or the like) can be controlled with high accuracy on the basis of the measurement value while minimizing the number of the sensors and the computation load.

In the case where the above embodiment is modified in any of the above-described manners, it is preferable to modify the details (design details) of the above-described various processing (programs) as appropriate into the optimal mode in accordance with the practical configuration.

The above-described embodiment and modifications assume the use of various kinds of software (programs). Alternatively, the similar functions may be implemented by hardware such as dedicated circuits.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection controller that controls a fuel injection mode of at least one injector by outputting a command signal when fuel used in combustion for generating an output power of a target engine is injected and supplied through the injector directly into at least one cylinder, in which the fuel combustion of the engine occurs, the fuel injection controller comprising:

at least one cylinder pressure sensor provided to at least one cylinder for outputting a sensing signal corresponding to pressure in the same cylinder; and an injection control means for variably controlling the command signal sent to the injector in relation to certain injection supply of the fuel, which is performed during the fuel combustion in the cylinder having the cylinder pressure sensor as an object cylinder for additionally injecting and supplying the fuel to be used in the combustion in the cylinder as the object cylinder, on the basis of an output of the cylinder pressure sensor when the certain injection supply of the fuel is performed;

wherein the injection control means predicts a valve closing timing cylinder pressure as a pressure in the cylinder as the object cylinder at certain timing when the injector ends a valve closing operation on the basis of an output of the cylinder pressure sensor sensed before the certain timing and variably controls the command signal relating to an injection quantity of the injector on the basis of the predicted valve closing timing cylinder pressure.

2. The fuel injection controller according to claim 1, further comprising:

a multiple injection means for performing the injection supply of the fuel into the cylinder as the object cylinder in a multiple injection method of injecting a total fuel quantity, which is supposed to be injected in one combustion cycle, through a plurality of injections, wherein the injection control means variably controls the command signal sent to the injector in relation to an after-injection performed next to a main injection among the plurality of injections performed by the multiple injection means, the main injection generating a main part of an output power of the engine.

3. The fuel injection controller according to claim 1, wherein the injection control means variably controls the command signal relating to an injection quantity of the injector on the basis of an output of the cylinder pressure sensor at timing when a valve opening operation start command is sent to the injector.

4. The fuel injection controller according to claim 1, wherein the injection control means variably controls the command signal relating to an injection quantity of the injector on the basis of an output of the cylinder pressure sensor at timing when the injector starts a valve opening operation.

5. The fuel injection controller according to claim 1, wherein the injection control means predicts the valve closing timing cylinder pressure on the basis of an output of the cylinder pressure sensor at timing when a valve opening operation start command is sent to the injector and an output of the cylinder pressure sensor at timing when the injector starts a valve opening operation.

6. The fuel injection controller according to claim 1, wherein the injection control means determines a center pressure as a pressure in the cylinder as the object cylinder at center timing between timing when the injector starts a valve opening operation and the certain timing when the injector ends the valve closing operation on the basis of an output of the cylinder pressure sensor at the timing when the injector starts the valve opening operation and the predicted valve closing timing cylinder pressure, and the injection control means variably controls the command signal relating to the injection quantity of the injector on the basis of the determined center pressure.

7. The fuel injection controller according to claim 1, wherein the injection control means determines an average pressure between timing when the injector starts a valve opening operation and the certain timing when the injector ends the valve closing operation on the basis of an output of the cylinder pressure sensor at the timing when the injector starts the valve opening operation and the predicted valve closing timing cylinder pressure, and the injection control means variably controls the command signal relating to the injection quantity of the injector on the basis of the determined average pressure.

8. The fuel injection controller according to claim 1, wherein the injector has a needle that opens or closes the injector by opening or closing an injection hole of the injector or a fuel supply passage leading to the injection hole through a prescribed reciprocating action thereof inside a valve body and is structured such that the needle is displaced to a valve-closing side by a force constantly applied to the needle in a direction toward the valve-closing side in a deactivated state and such that the needle receives a drive force and is displaced to a valve-opening side by the drive force against the force directed toward the valve-closing side in an activated state, the injection control means determines a pressure in the cylinder as the object cylinder at timing when the needle is located at a maximum displacement position on the valve-opening side on the basis of an output of the cylinder pressure sensor at the same timing or outputs of the cylinder pressure sensor at timings before and after the same timing, and the injection control means variably controls the command signal relating to an injection quantity of the injector on the basis of the determined pressure.

9. The fuel injection controller according to claim 1, wherein the injection control means determines a correction value or a new value of valve closing operation start command on the basis of an output of the cylinder pressure sensor before outputting the valve closing operation start command to the injector, and the injection control means variably sets the valve closing operation start command on the basis of the correction value or the new value.

10. A method of controlling a fuel injection mode of at least one injector by outputting a command signal when fuel used in combustion for generating an output power of a target engine is injected and supplied through the injector directly into at least one cylinder, in which the fuel combustion of the engine occurs, the method comprising:

providing at least one cylinder pressure sensor to at least one cylinder and outputting a sensing signal, from the pressure sensor, corresponding to pressure in the same cylinder; and variably controlling the command signal sent to the injector in relation to certain injection supply of the fuel, which is performed during the fuel combustion in the cylinder having the cylinder pressure sensor as an object cylinder for additionally injecting and supplying the fuel to be used in the combustion in the cylinder as the object cylinder, on the basis of an output of the cylinder pressure sensor when the certain injection supply of the fuel is performed; and predicting a valve closing timing cylinder pressure as a pressure in the cylinder as the object cylinder at certain timing when the injector ends a valve closing operation on the basis of an output of the cylinder pressure sensor sensed before the certain timing and variably controlling the command signal relating to an injection quantity of the injector on the basis of the predicted valve closing timing cylinder pressure.

11. The method according to claim 10, further comprising:

performing the injection supply of the fuel into the cylinder as the object cylinder in a multiple injection method of injecting a total fuel quantity, which is supposed to be injected in one combustion cycle, through a plurality of injections, wherein variably controlling the command signal sent to the injector in relation to an after-injection is performed next to a main injection among the plurality of injections performed, the main injection generating a main part of an output power of the engine.

12. The method according to claim 10, wherein variably controlling the command signal relates to an injection quantity of the injector on the basis of an output of the cylinder pressure sensor at timing when a valve opening operation start command is sent to the injector.

13. The method according to claim 10, wherein variably controlling the command signal relates to an injection quantity of the injector on the basis of an output of the cylinder pressure sensor at timing when the injector starts a valve opening operation.

14. The method according to claim 10, further comprising predicting the valve closing timing cylinder pressure on the basis of an output of the cylinder pressure sensor at timing when a valve opening operation start command is sent to the injector and an output of the cylinder pressure sensor at timing when the injector starts a valve opening operation.

15. The method according to claim 10, further comprising determining a center pressure as a pressure in the cylinder as the object cylinder at center timing between timing when the injector starts a valve opening operation and the certain timing when the injector ends the valve closing operation on the basis of an output of the cylinder pressure sensor at the timing when the injector starts the valve opening operation and the predicted valve closing timing cylinder pressure, and wherein variably controlling the command signal relates to the injection quantity of the injector on the basis of the determined center pressure.

16. The method according to claim 10, further comprising determining an average pressure between timing when the injector starts a valve opening operation and the certain timing when the injector ends the valve closing operation on the basis of an output of the cylinder pressure sensor at the timing when the injector starts the valve opening operation and the predicted valve closing timing cylinder pressure, and wherein variably controlling the command signal relates to the injection quantity of the injector on the basis of the determined average pressure.

17. The method according to claim 10, wherein the injector has a needle that opens or closes the injector by opening or closing an injection hole of the injector or a fuel supply passage leading to the injection hole through a prescribed reciprocating action thereof inside a valve body and is structured such that the needle is displaced to a valve-closing side by a force constantly applied to the needle in a direction toward the valve-closing side in a deactivated state and such that the needle receives a drive force and is displaced to a valve-opening side by the drive force against the force directed toward the valve-closing side in an activated state, and further comprising determining a pressure in the cylinder as the object cylinder at timing when the needle is located at a maximum displacement position on the valve-opening side on the basis of an output of the cylinder pressure sensor at the same timing or outputs of the cylinder pressure sensor at timings before and after the same timing, and variably controlling the command signal relates to an injection quantity of the injector on the basis of the determined pressure.

18. The method according to claim 10, further comprising determining a correction value or a new value of valve closing operation start command on the basis of an output of the cylinder pressure sensor before outputting the valve closing operation start command to the injector, and variably setting the valve closing operation start command on the basis of the correction value or the new value.

* * * * *